No. 630,909. Patented Aug. 15, 1899.
E. W. MOCH.
ARTIFICIAL PLUME.
(Application filed June 10, 1899.)
(No Model.)
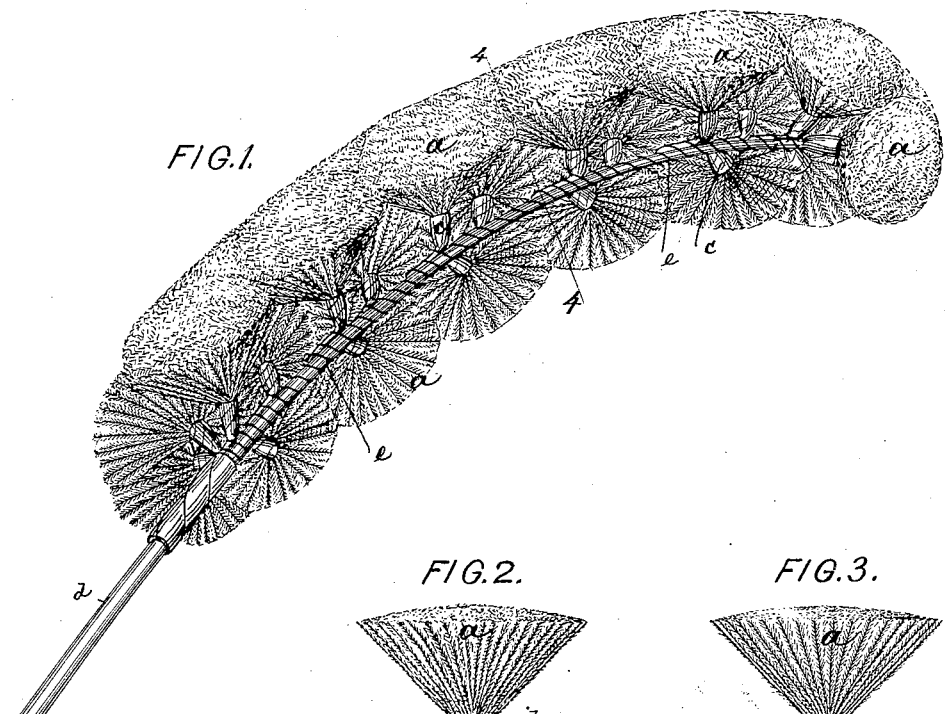
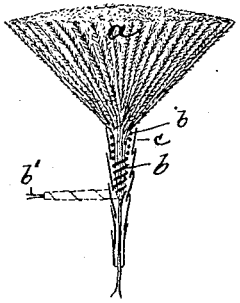
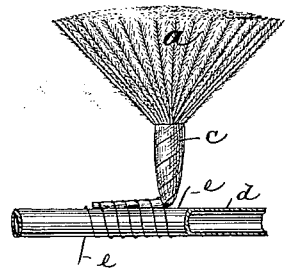
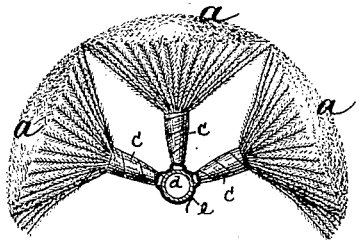
Witnesses:
John Becker.
William Schulz.
Inventor:
Eugene W. Moch
by his attorneys
Roeder & Briesen

UNITED STATES PATENT OFFICE.

EUGENE W. MOCH, OF NEW YORK, N. Y.

ARTIFICIAL PLUME.

SPECIFICATION forming part of Letters Patent No. 630,909, dated August 15, 1899.

Application filed June 10, 1899. Serial No. 720,029. (No model.)

*To all whom it may concern:*

Be it known that I, EUGENE W. MOCH, a citizen of the United States, and a resident of New York city, county and State of New York, have invented new and useful Improvements in Artificial Plumes, of which the following is a specification.

This invention relates to an artificial plume which is formed from the cuttings of ostrich or other feathers that have heretofore generally gone to waste. These cuttings I collect into tufts and mount them upon a common stem in such a manner that they merge into a common plumed crown of rich appearance.

In the accompanying drawings, Figure 1 is a perspective view of my improved plume. Figs. 2 and 3 are details of one of the tufts, showing it in successive stages of manufacture; and Fig. 4, a cross-section on line 4 4, Fig. 1.

The cuttings or waste of ostrich or other feathers is assembled into bunches of suitable sizes and each bunch is at its lower end bound by an encircling wire $b$, so as to form a tuft with a spreading arched crown. A wrapper $c$, of silk, paper, or other material, is wound around the tied stems of the cuttings to form a neat finish. The wire $b$ should be of a length to project beyond the cuttings, and its free end $b'$ is bent at about right angles, Fig. 2, to form an arm, by means of which the tuft is attached to the supporting-stem.

A number of tufts prepared in the manner described are now fastened upon the common stem or quill $d$ by placing the ends $b'$ of wires $b$ longitudinally upon such stem and uniting them thereto by a common binding wire or string $e$.

Owing to the stiffness of the wire $b$, the tufts will project radially at the proper angle from the stem $d$ and the crowns of the tufts will merge, so as to form a continuous plumed surface. The particular arrangement and relative disposition of the tufts upon the stem is of course subject to taste and to the effect desired to be produced and is open to infinite variations. I prefer, however, to so mount the tufts that they project radially from the top and sides of the stem, Fig. 4, to form a crown of arched or semicircular form in cross-section in contradistinction to the straight-crowned natural plumes, thus producing a new and highly-pleasing effect.

My improved artificial plumes are serviceable for hat and dress trimmings, ruchings, neckwear, and for kindred uses. They will retain their shape in rain and dampness and may be manufactured at a small cost.

What I claim is—

1. An artificial plume composed of feather-cuttings formed into tufts, and of a common stem upon which the tufts are mounted, substantially as specified.

2. An artificial plume composed of tufts of feather-cuttings, bent wires secured to and projecting at an angle from the tufts, a common stem, and means for attaching the bent ends of the wires to the stem, substantially as specified.

3. An artificial plume composed of tufts of feather-cuttings, wires coiled around the lower ends of the tufts and having bent ends, a surrounding covering, a common stem, and means for attaching the bent ends of the wires to the stem, substantially as specified.

4. An artificial plume composed of a stem, and of feather-cuttings formed into tufts that project from the top and sides of the stem to form a continuous plumed crown which is arc-shaped in cross-section, substantially as specified.

EUGENE W. MOCH.

Witnesses:
HARRY COHEM,
L. G. THIEND.